United States Patent [19]
Fougnies et al.

[11] Patent Number: 5,722,067
[45] Date of Patent: Feb. 24, 1998

[54] SECURITY CELLULAR TELECOMMUNICATIONS SYSTEM

[75] Inventors: Douglas V. Fougnies; Dan B. Harned, both of Tempe, Ariz.

[73] Assignee: Freedom Wireless, Inc., Las Vegas, Nev.

[21] Appl. No.: 364,479

[22] Filed: Dec. 23, 1994

[51] Int. Cl.$^6$ ........................................................ H04Q 7/20
[52] U.S. Cl. ........................... 455/406; 455/408; 455/415; 379/114; 379/127
[58] Field of Search .......................... 379/58, 59, 60, 379/33.2, 144, 114, 115, 127; 455/33.1, 33.2, 406–411, 414, 415

[56] References Cited

U.S. PATENT DOCUMENTS

| | | | |
|---|---|---|---|
| 4,756,020 | 7/1988 | Fodale | 379/112 |
| 4,852,149 | 7/1989 | Zwick et al. | 379/67 |
| 4,860,341 | 8/1989 | D'Avello et al. | 379/91 |
| 5,046,088 | 9/1991 | Margulies | 379/211 |
| 5,127,040 | 6/1992 | D'Avello et al. | 379/58 |
| 5,233,642 | 8/1993 | Renton | 379/59 |
| 5,265,155 | 11/1993 | Castro | 379/112 |
| 5,274,802 | 12/1993 | Altine | 395/600 |
| 5,291,543 | 3/1994 | Freese et al. | 379/59 |
| 5,297,189 | 3/1994 | Chabernaud | 379/58 |
| 5,309,501 | 5/1994 | Kozik et al. | 379/58 |
| 5,321,735 | 6/1994 | Breeden | 379/58 |
| 5,327,144 | 7/1994 | Stilp et al. | 342/387 |
| 5,341,414 | 8/1994 | Popke | 379/142 |
| 5,353,335 | 10/1994 | D'Urso | 379/67 |
| 5,359,642 | 10/1994 | Castro | 379/121 |
| 5,440,621 | 8/1995 | Castro | 379/112 |
| 5,592,535 | 1/1997 | Klotz | 379/58 |

OTHER PUBLICATIONS

*AT&T Technical Journal*, Summer 1991; pp. 11–25, 44–57, and 72–84.
*Proceedings of the IEEE*, vol. 79, No. 1, Jan. 1991; pp. 7–20.

Primary Examiner—Dwayne Bost
Assistant Examiner—Nay Maung
Attorney, Agent, or Firm—Cahill, Sutton & Thomas P.L.C.

[57] ABSTRACT

A cellular telecommunications system having a security feature which allows only pre-authorized users no complete cellular telephone calls. The system and method recognizes a cellular radiotelephone's pre-programmed a pre-selected telephone number and a automated number identification code (ANI). The pre-selected telephone number is reserved to the pre-paid cellular telecommunications system. The cellular radiotelephone transmits the ANI and a dialed number identification system code (DNIS) to a cellular switch, which contacts a host computer for call validation the pre-paid service provider.

21 Claims, 6 Drawing Sheets

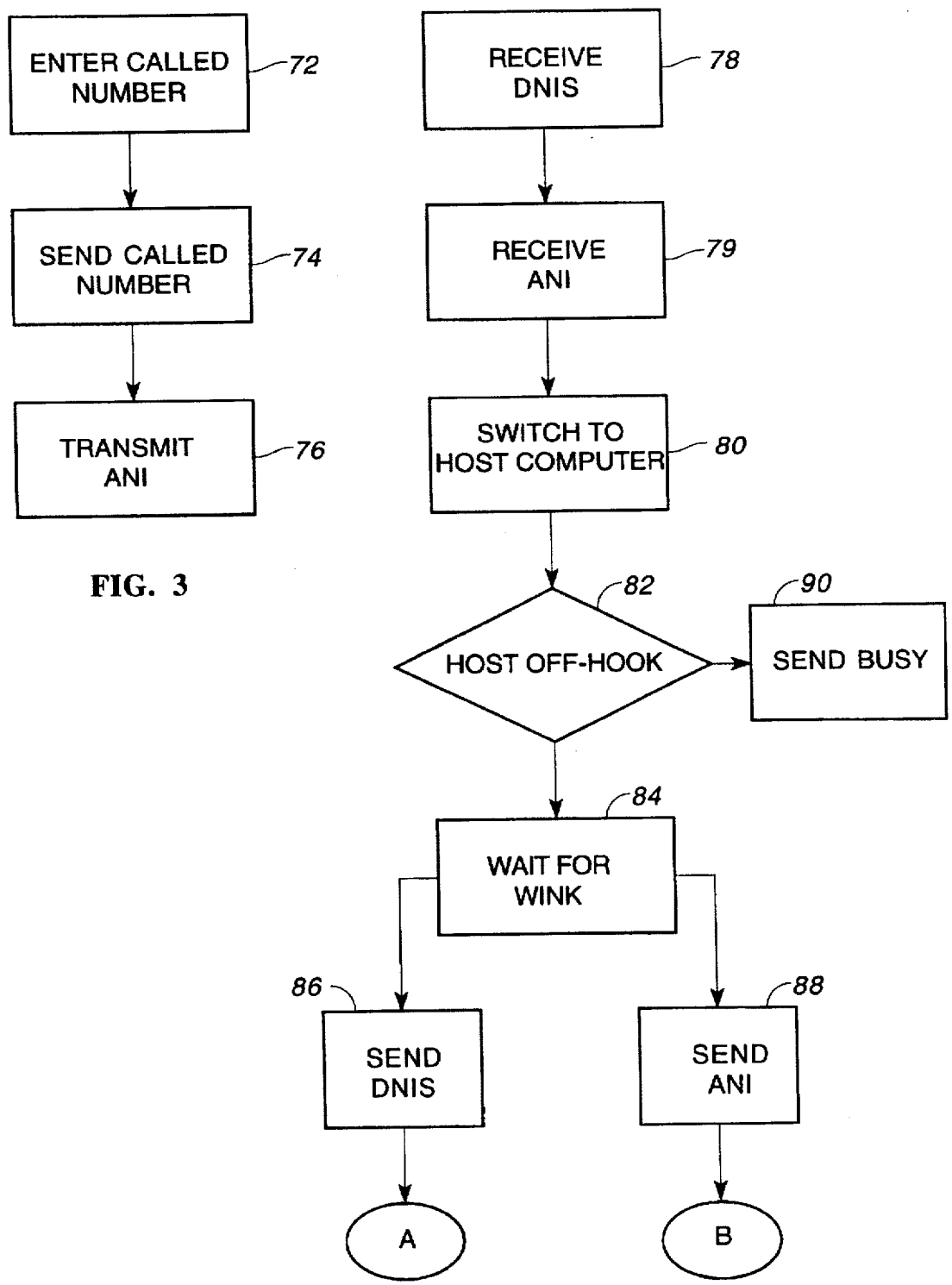

SECURITY CELLULAR TELECOMMUNICATIONS SYSTEM

BACKGROUND OF THE INVENTION

The present invention relates generally to a cellular telecommunications system having a security feature which allows only pre-authorized users to complete cellular telephone calls. More particularly, the cellular telecommunications system of the present invention permits cellular telecommunications providers to obtain pre-paid subscribers and eliminate credit-risk problems. In addition, the present invention provides anti-fraud protection for cellular service providers by allowing subscribers to designate protection codes which must be dialed before a telecommunications event will be completed.

Conventional cellular telecommunications systems require the cellular provider to undertake credit screening and certify credit-worthy subscribers before enabling a user to access the cellular telecommunications system. Customarily, a potential subscriber will apply to the cellular service provider, who then undertakes a verification process to determine whether the potential subscriber is credit-worthy. If the potential subscriber has a positive credit rating, the subscriber is given access to the cellular system and is able to initiate or receive unlimited cellular telecommunications events during a certain period of time or during a certain number of billing cycles. If the subscriber regularly pays invoices for the telecommunications services, the subscriber's access to the telecommunications system continues unfettered. If the subscriber fails to pay invoices as they become due, the cellular service provider has the ability to discontinue the subscriber's access until the invoice is paid. Thus, pre-paid telecommunications access is a desirable feature to prevent fraudulent use of the telecommunications system. Additionally, the present invention provides anti-fraud capabilities by requiring that a pass-code or personal identification number (PIN) be dialed along with the called number before a telecommunications event will be completed.

Up to now, the cellular service provider had no means available to offer cellular telecommunications services on a pre-paid basis, monitor the subscriber's cellular telecommunications usage in real time and discontinue access to the cellular telecommunications services immediately upon exhaustion of a pre-paid account balance. Additionally, up to now, cellular service providers had no means available to prevent cellular theft by unscrupulous persons retrieving equipment serial numbers from cellular signal transmissions and "cloning" or reprogramming other cellular equipment to replicate a subscriber's telecommunications profile.

DESCRIPTION OF THE PRIOR ART

Land-based telecommunication systems have devised a method for allowing pre-paid telephone usage and limiting telecommunications usage to only a period of time equivalent to the pre-paid value. Perhaps the best example of such a land-based telecommunications system is found in U.S. Pat. No. 5,353,335 issued Oct. 4, 1994, to D'Urso (hereinafter the "D'Urso" patent).

The D'Urso patent discloses a public switched telephone network (PSTN) which operates on a pre-payment system and has multilingual capabilities. A telephone user purchases a predetermined quantum of service, i.e., telecommunications time before access and is provided a card imprinted with a unique account number. The user is also given a series of toll free, commonly Known as "1-800" number which allows the user to access the prepaid telephone system. Activation of each of the toll free numbers causes the system described in the D'Urso patent to interact with the user in the user' native language or in a language which the user desires to interact with the telecommunications system. Upon dialing an appropriate toll free telephone number at a PSTN node, the user is connected through a switching system with a host computer. The host computer prompts the user, typically by digital voice commands, to enter the user's account number, using the PSTN node keypad, imprinted on the user's account card. The authenticity of the entered account number and the available amount of credit is determined by the host computer. Account authentication and credit balance checking is accomplished by local area network connection with a service management computer which manages a card database containing account information for each outstanding account card. If the account valid and an available balance is verified, the host computer prompts the user to enter a speed dialing alias or destination telephone number. The user is given a pre-set number of attempts to enter a valid alias or destination number. The system performs editing checks on the alias or destination number. Improper entry of a speed dialing alias or destination for the pre-set number of attempts will cause the host computer to disconnect the user. Upon proper entry of a speed dialing alias or destination number, the host computer compares the available card balance against the balance required to make a one minute phone call to the desired destination. If the available balance is greater than or equal to the balance required to make that one minute call, a voice response unit (VRU) plays an announcement in the user's chosen language informing the user that the call is being processed. The VRU computer uses a stored call rate associated with the caller's destination number and the available credit balance to determine the available call duration. A call duration timer is set in response to the determination of the available call duration.

The VRU computer is then directed to outpulse the digits of the destination number to a network node. When the host computer detects an off-hook condition from the destination, the call duration timer is started and the available call balance is depleted while the call is in progress. When the host computer detects that the available call balance is close to depletion, the VRU computer is bridged onto the call and plays a pending disconnect announcement in the users chosen language. Upon exhaustion of the call balance, the VRU plays a disconnect announcement, the call is disconnected and the host computer sends a message to the service management computer and database that the balance on the card is depleted.

Alternatively, if an on-hook condition at the destination occurs before the card balance is depleted, the host computer calculates the remaining available balance based upon the condition of the call timer and compares the computed balance to the minimum credit threshold. The host computer then causes a VRU computer to notify the caller, in the chosen language, whether the remaining balance exceeds the minimum credit threshold, and the value of the available balance and then disconnects the calling party. The host computer then sends an update message to the service management computer and the database, notifying them of the calculated remaining balance. The service management computer then overwrites the present balance in the database with the calculated balance sent by the host computer.

While the D'Urso telecommunications system allows for pre-paid telecommunications activity, it is wholly dependent upon user first calling a toll free number, inputting account information, waiting for account validation, inputting the called destination, waiting for destination validation and then either being connected or not. The D'Urso system requires a plurality of input events by the user before a call can be passed to the destination. Moreover, the D'Urso system lacks direct interface with the remote database for real time account balance adjustment during a telecommunications event. Rather, in the D'Urso system a host computer queries a remote management server database to determine an available credit balance. The host computer then looks up a telecommunications rate for the destination number called, calculates a time value corresponding to the credit balance for the destination number and either authorizes or rejects the attempted call on the basis of the calculated time value. If the attempted call is authorized, a calculated tame value timer is set. Upon occurrence of an off-hook condition at the destination called, the calculate time value timer at the host computer is decremented until a pre-determined threshold value. As the threshold value is reached, a voice message is bridged onto the call to advise the user of the remaining calculated time value. Upon expiration of the calculated time value, the call is disconnected. After disconnection due to either 1) expiration of the calculated time value, or 2) an on-hook condition at the called desalination, the host computer re-calculates the credit balance from the remaining time value and sends an update record to the management server and database and overwrites the previous credit balance information stored at the database. In this manner, the database is not actively updated as the telecommunications activity is occurring.

Those skilled in the art will understand and appreciate that the prepaid land-based telecommunications system described in the D'Urso patent is fundamentally different from the cellular-based telecommunications system of the present invention.

SUMMARY OF THE INVENTION

A need has been recognized for a cellular telecommunications system which permits access by pre-paid users, without the need for modifying the cellular radiotelephones commonly in use. The present invention provides a system and method which recognizes cellular radiotelephones pre-programmed with a pre-selected telephone number and an automated number identification code (ANI). The pre-selected telephone number is reserved to the pre-paid cellular telecommunications system. The user merely enters the destination telephone number and activates an off-hook condition, typically by depressing a "send" button on the keypad of the cellular radiotelephone. The cellular radiotelephone then transmits the ANI and a dialed number identification system code (DNIS). Because all cellular systems operate on the basis of discrete cell sites, which re-transmit the received signal to a central cellular service organization cellular switch, both the ANI and the DNIS are transmitted to the cellular switch. At the cellular switch, the ANI is recognized as one reserved to the pre-paid cellular system and is re-directed, along with the DNIS, to the pre-paid cellular system switch via T1 land lines or via cellular re-transmission.

At the pre-paid cellular system switch, a host computer authenticates both the ANI and DNIS. Upon recognition of a valid ANI, the host computer establishes communications via either a local area network (LAN) or wide-area network (WAN) with a remote computer database server. At the remote computer database server, a database is maintained with pre-paid subscriber information. The pre-paid subscriber database contains records of each pre-paid subscriber. Each subscriber record in the database includes, at least the ANI assigned to that pre-paid subscriber, a pre-paid account balance and a time rate for telecommunications charges. The host computer validates the received ANI by comparison to the ANI information in the database. Upon validation of the received ANI, account balance information for the account associated with the received ANI is queried to determine if there is a positive credit balance. Upon verification that the account has a positive credit balance, the host computer outpulses the dialed destination telephone number to a local exchange carrier, such as one of the Regional Bell Operating Companies.

During the call progress, tile account balance information at the computer database server is decremented based upon elapse of pre-determined time periods at the predetermined time value for cellular telecommunications. It is important to note the time value is deducted from the account balance at regular intervals of time while the call is in progress.

The present invention allows a pre-paid user to access the cellular telecommunication system and have authentication and accounting occur transparently without any preliminary input by the user. The present invention accomplishes this by using the ANI as the file link to identify and authenticate the cellular telephone against the database. Thus, cellular telephone users are freed of the need to carry and use cards, are freed of the need to enter account information as a first step in the authentication process and the possibility of fraud on the cellular service providers is minimized.

These and other objects, features, and advantages of the present invention will become more apparent to those skilled in the art from the following more detailed description of the present invention when taken with reference to the accompanying drawings.

BRIEF DESCRIPTION OF THE DRAWINGS

FIG. 3 is a call flow diagram from a typical cellular radiotelephone.

FIG. 4 is a call flow diagram at a cellular switch in accordance with the present invention.

DETAILED DESCRIPTION OF THE PREFERRED EMBODIMENTS

Figure 1:
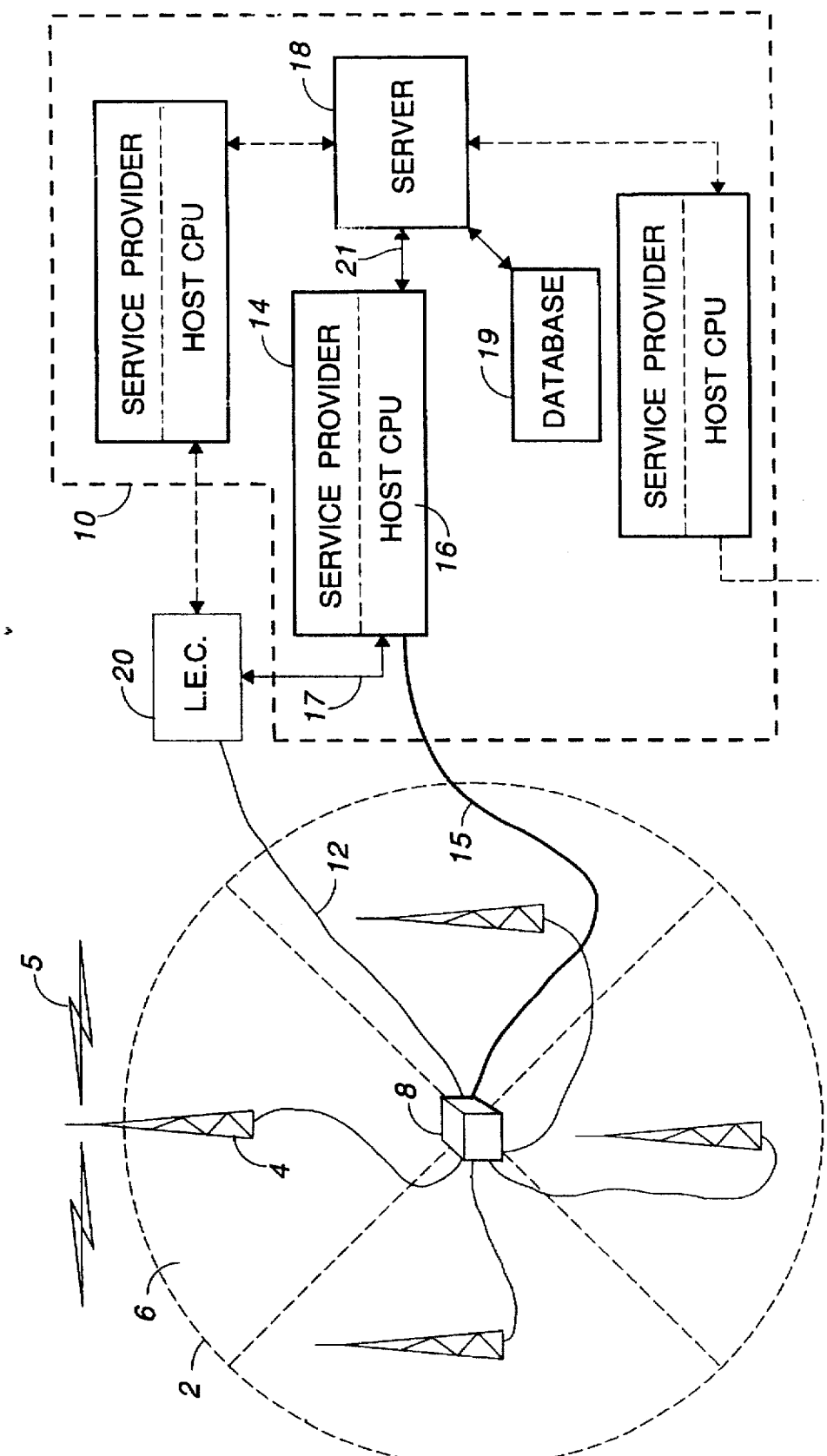
FIG. 1 is a diagrammatic view of a typical cellular telecommunications system interfaced with the cellular telecommunications system of the present invention.
Figure 2:
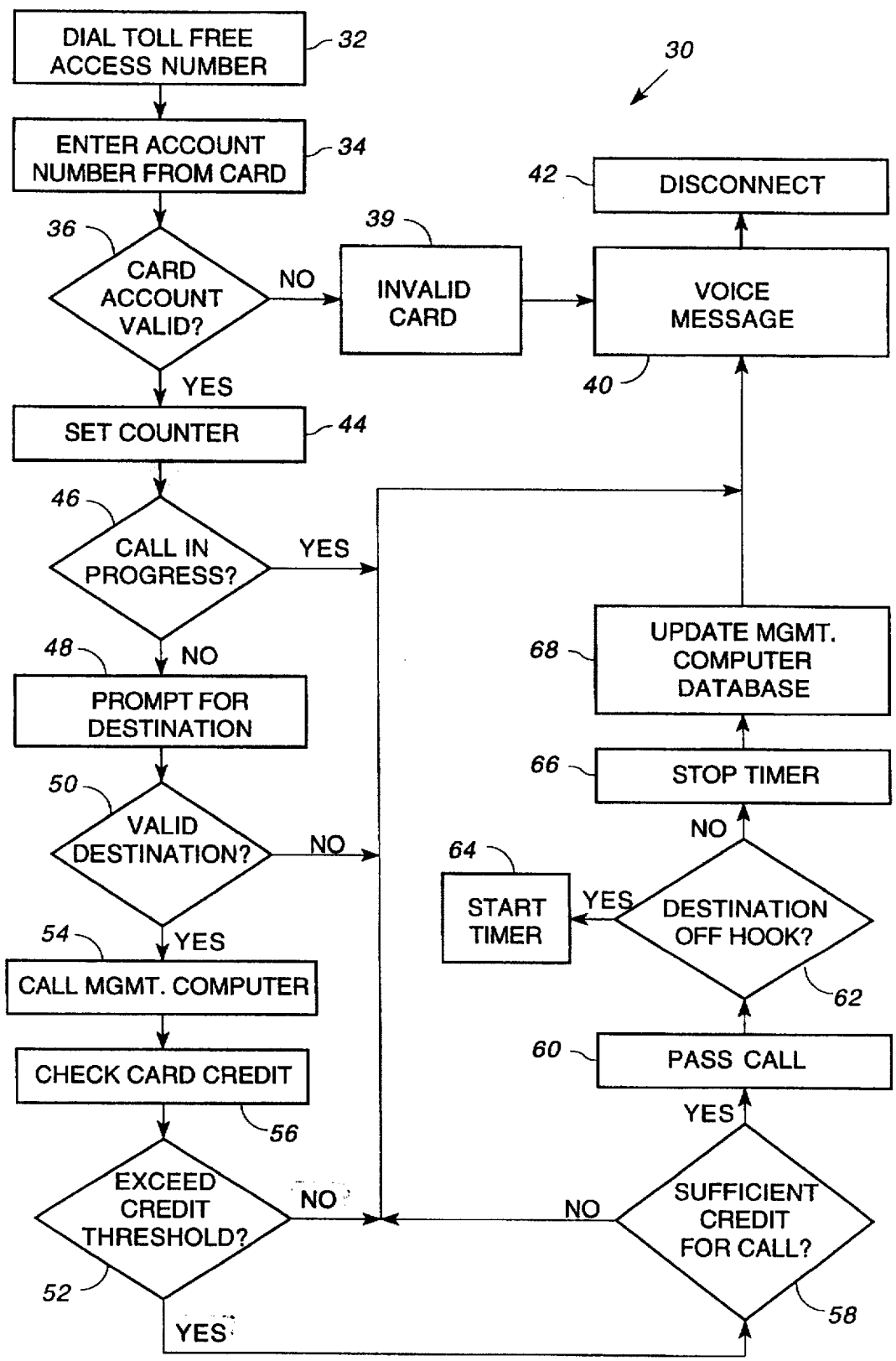
FIG. 2 is a diagrammatic call flow of the prior art pre-paid land-based telecommunications system.

The prepaid cellular telecommunications system of the present invention is best illustrated with reference to the accompanying drawings in which FIGS. 1 and 3 through 8B generally describe the system of the present invention and FIG. 2 depicts the prior art system described in the D'Urso patent.

With particular reference to FIG. 1, the pre-paid cellular system 10 of the present invention is illustrated. The pre-paid cellular system 10 interfaces with a conventional cellular telecommunications switched network 2. Conventional cellular telecommunications switched network 2 is a network consisting of a plurality of cellular antenna, such as antenna 4, capable of receiving cellular band RF signals 5, with each antenna being located in a discrete cell site, such as site 6. Each antenna is electrically linked to cellular switch 8 which governs the operation of the cellular telecommunications switched network 2 and links the network 2 to local exchange carrier 20 via T1 land line 12.

In accordance with the present invention, a cellular service provider 14 is linked to the cellular telecommunications switched network 2 cellular switch 8 via T1 land lines 15. The cellular service provider 14 has a plurality of cellular telephone numbers reserved to it for pre-paid subscribers. Each reserved cellular telephone number has a unique automated number identifier (ANI) associated with the reserved telephone number. These reserved cellular telephone numbers are stored in a switch computer resident at switch 8. The cellular service provider 14 is electrically linked to the local exchange carrier 20 via T1 land lines 17 to communicate cellular telephone calls from the service provider 14 to the local exchange carrier's regular network.

The service provider 14 has host computer 16 which is preferably networked through either a local area network (LAN) or wide area network (WAN) 21 to a remote server computer 18. In this manner a plurality of service providers may, within a single cellular service, operate from the same remote server computer 18. The remote server computer 18 has an associated database 19 of pre-paid subscribers, which is independently accessible by each of the service providers.

The host computer is preferably based upon a multi-processor platform such as those made by Intel Corporation and based upon the 486 or PENTIUM microprocessor, with each host computer having a plurality of modems and network interface circuit boards capable of simultaneous bi-directional processing of telecommunications data between the T1 land lines 15 and the modems and between the host computer and the remote server. The remote server is also preferably a multi-processor based platform capable of distributed load processing, and fitted with a plurality of network interface circuit boards. The database is preferably stored across n plurality of hard disk drives configured as a redundant array of independent drives (RAID).

In the foregoing manner, a cellular transmission 5 received by an antenna 4 within a cell size 6 is received at switch 8. If the ANI and DNIS transmitted with the cellular transmission 5 is one of the reserved pre-paid cellular telephone numbers, the switch 8 re-directs the transmission 5 to the service provider via the T1 land line 15. The transmission 5 is communicated to the service provider's host computer 16, which then authenticates the ANI and DNIS by accessing the server computer 18 and database 19. Upon valid authentication of the ANI and DNIS, the subscriber identity is validated. The database 19 will have records indicative of the subscriber's account balance. A check of the subscriber's account balance in the database 19 is made to validate the presence of a pre-paid balance sufficient to supply a pre-determined quantum of telecommunications, e.g., one minute, at a predetermined telecommunications charge rate associated with both the dialed number and the time of day in which the call is placed. Upon account balance validation, the host computer 16 validates the call and passes it to the local exchange carrier 20 via the T1 land lines 17.

A pre-payment telecommunications system 30 of the prior art is illustrated with reference to FIG. 2. The system 30 requires that a pre-paid user first dial a toll free access number at block 32. Upon connection with the toll free access number, the user must enter an assigned account number imprinted on a card at block 34. After the card account number is validated at block 3G, a counter is set at block 44 and a check is made at block 46 to determine whether a call on the entered account is in progress. A negative validation at block 36 will cause an invalid card flag to be initiated at block 38 and an appropriate voice message from a voice response unit (VRU) announced at block 40. If an affirmative response is elicited from the check at block 46, the VRU prompts the user to enter a destination telephone number at block 48. A validation check is made at block 58 of the dialed number entered in response to the VRU prompt at block 48. If the validation check at block 50 is affirmative, a database associated with a management computer is called at block 54 and the account's records are retrieved for credit balance determination. A check is made of the credit associated with the card account to determine whether the user's account has any available credit at block 56 and whether the available credit exceeds a pre-determined minimum threshold at block 52. An additional check is made to determine whether sufficient credit in the user's account balance to pay for a threshold time value of a call, e.g., one minute, based upon a time value rate for the destination being called is determined at block 58. If the determinations made at blocks 52, 56 and 58 are affirmative the call is passed by outpulsing the dialed number at block 50. If a negative determination at any of blocks 52, 56 or 58 is made, an appropriate voice message is played by the VRU at block 40 and the user is disconnected at block 42.

Upon connection with the destination number, an off-hook condition of the destination is sensed at block 62. If an off-hook condition exists at the destination, a timer is started at block 64 which continues until art on-hook condition exists at the destination and the timer is stopped at block 66. Upon a stop timer condition at block 66, the management computer is called and updated by overwriting the user's account record with updated information based upon the elapsed time of the call and the time value of the call at block 68. The VRU then issues an appropriate voice message 40 to advise the user of the revised account balance and the user is disconnected at block 42.

As will be understood by those skilled in the art, the foregoing description of the pre-paid telecommunications system of the prior art 30 requires the user to first access a toll-free number to be linked to a host computer, and then must enter an account code and wait for validation and then enter a destination number, and wait for validation before the call is passed. The present invention operates advantageously with a cellular telecommunications system to eliminate the need for a toll free host computer to interact directly with the user, and eliminate the need for the pre-paid user to make multiple keypad entries. Rather, as will be more apparent from the following description of the preferred embodiment, the user only enters the destination number and all call processing is handled by the host computer in conjunction with the cellular switch.

Turning now to FIGS. 3–3B, call flow in the pre-paid cellular telecommunications system of the present invention is illustrated. It is important to note that the cellular radiotelephones used by pro-paid subscribers are of a conventional type, without special circuitry, modification or programming. Rather, each cellular radiotelephone used by pre-paid subscribers is programmed, in the normal manner, with a pre-defined cellular telephone number reserved to the pre-paid cellular telecommunications system 10.

FIG. 3 illustrates call initiation by a pro-paid cellular telecommunications subscriber. The subscriber initiates a cellular call at block 72 by entering the destination number directly at the keypad of the cellular radiotelephone. After the subscriber enters the called number, the subscriber sends the destination number (DNIS) by activating a send key on the keypad of the cellular radiotelephone at block 74. The cellular radiotelephone then transmits the DNIS and an ANI unique to the transmitting cellular radiotelephone at block 76 as cellular signals 5 to the nearest antenna within the cell site.

FIG. 4 illustrates call processing by the cellular switch 8. The cellular switch 8 is constantly in a wait condition for receipt of cellular transmissions from a plurality of subscribers within the coverage area of the cellular switch. The cellular switch receives the transmitted DNIS at block 78 and the transmitted ANI at block 79. Upon recognition of the ANI as a unique ANI identifying a subscriber in the inventive pre-paid cellular system, the cellular switch routes the cellular call through a direct line to a host computer of the inventive cellular system at block 80 and goes off-hook to the host computer at block 82. The cellular switch then waits for receipt of a wink signal at block 84. Upon receipt of a first wink signal at block 84, the cellular switch sends the DNIS to the host computer at block 86. Upon receipt of a second wink signal at block 84, the cellular switch sends the ANI to the host computer at block 88. Those skilled in the art will understand that the sequential order of sending the DNIS and ANI may be reversed. After sending the DNIS and ANI, the cellular switch waits for an off-hook condition from the host computer to connect the call. If the host computer fails to go off-hook within a pre-determined period of time, the cellular switch drops the caller.

Figure 5:
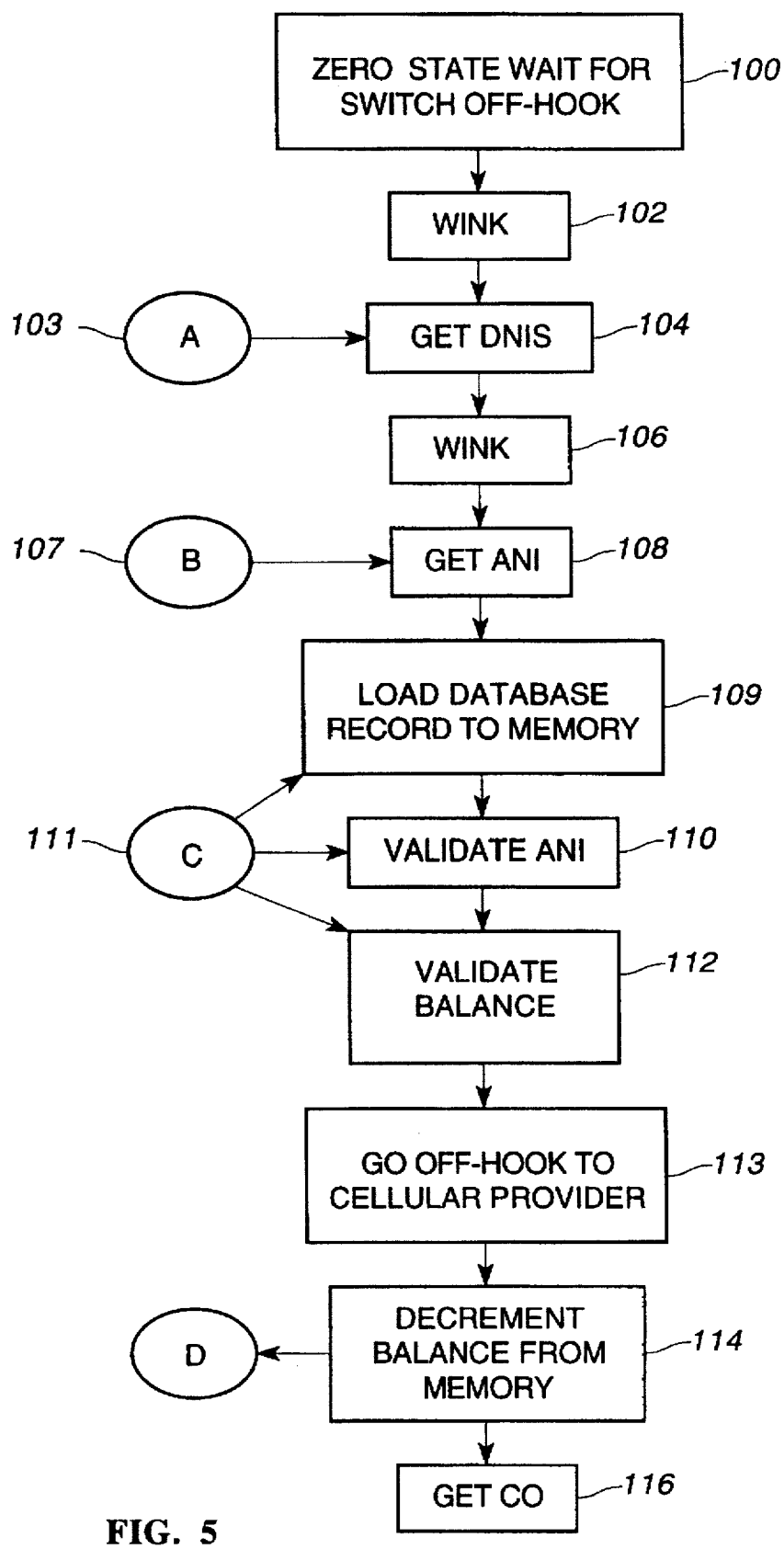
FIG. 5 is a flow diagram illustrating call validation processing at a host computer in accordance with the present invention.

Call processing at the host computer is illustrated in FIG. 5. The host computer's initiated zero state is to wait for a cellular switch off-hook condition to the host Upon receipt of an off-hook condition from the cellular switch, the host computer sends a first wink signal to the cellular switch at block 102 which tells the cellular switch to send the DNIS. The host computer then receives the DNIS 103 from the cellular switch at block 104. After receiving the DNIS at block 104, the host computer sends a second wink signal to the cellular switch at block 106 which tells the cellular switch to send the ANI. The host computer then receives the ANI 107 from the cellular switch at block 108. The host computer accesses the subscriber database from the remote server 11 and loads the database record corresponding to the received ANI to memory at block 109. The received ANI is validated against the database record in memory as one belonging to a pre-paid subscriber at block 110. Upon ANI validation at block 110, the host computer then validates the subscriber's pre-paid balance based upon the DNIS and time of day rate, e.g., peak or off-peak time rates, at block 112.

Those skilled in the art will understand and appreciate that the processing of the DNIS and ANI signals may occur in reverse order, and that different cellular service providers may use alternative signals to represent the dialed number and the subscriber's cellular radiotelephone. For example, the cellular radiotelephone's electronic serial number (ESN) may be transmitted instead of the ANI. The ANI is referenced, herein only by way of example.

Upon balance validation at block 112, the host computer goes off-hook to the cellular provider at block 113 and a pre-determined minimum time rate is decremented from the subscriber's balance in memory at block 114 and then the call accounting loop is initiated at block D. While at present time, it is preferable to use memory, those skilled in the art will understand that future improvements in LAN and WAN communication speeds and database read-write speeds may obviate the desirability of loading the account balance to memory to facilitate subsequent call accounting processing. The host computer then outpulses the DNIS, or another host computer-qualified signal including the called telephone number, such as a pass-code or PIN number, or the DNIS stripped of the area code, to the local exchange carrier for connection at block 98 to obtain a central office (CO) line.

Figure 6:
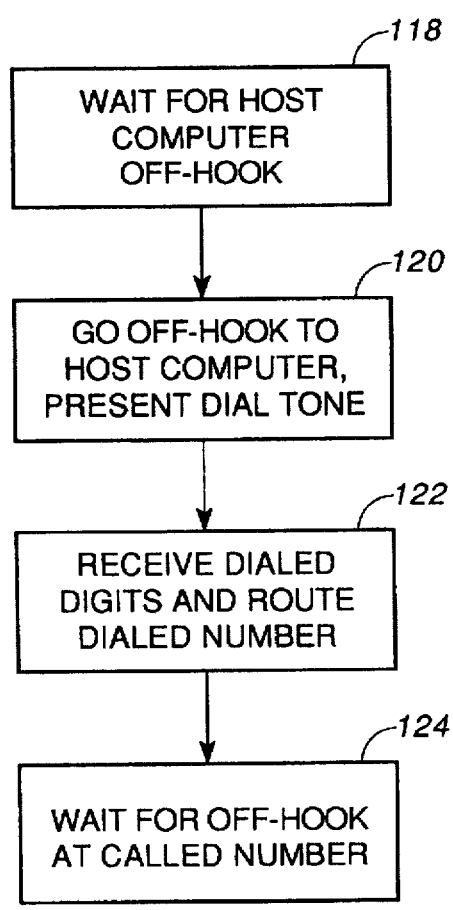
FIG. 6 is a flow diagram illustrating call processing at the central office in accordance with the present invention.

Turning now to FIG. 6, the CO is in a zero state waiting for an off-hook from the host computer at block 118. Upon an off-hook condition from the host computer at block 118, the CO goes off hook to the host computer and presents a dial tone at block 120. After the T1 land line has been seized, the DNIS or a host-computer modified DNIS, is received and routed over the T1 land line to the number dialed out by the host computer at block 122. The CO then waits for an off-hook condition at the called telephone number at block 124 and connects the call.

Figure 7:
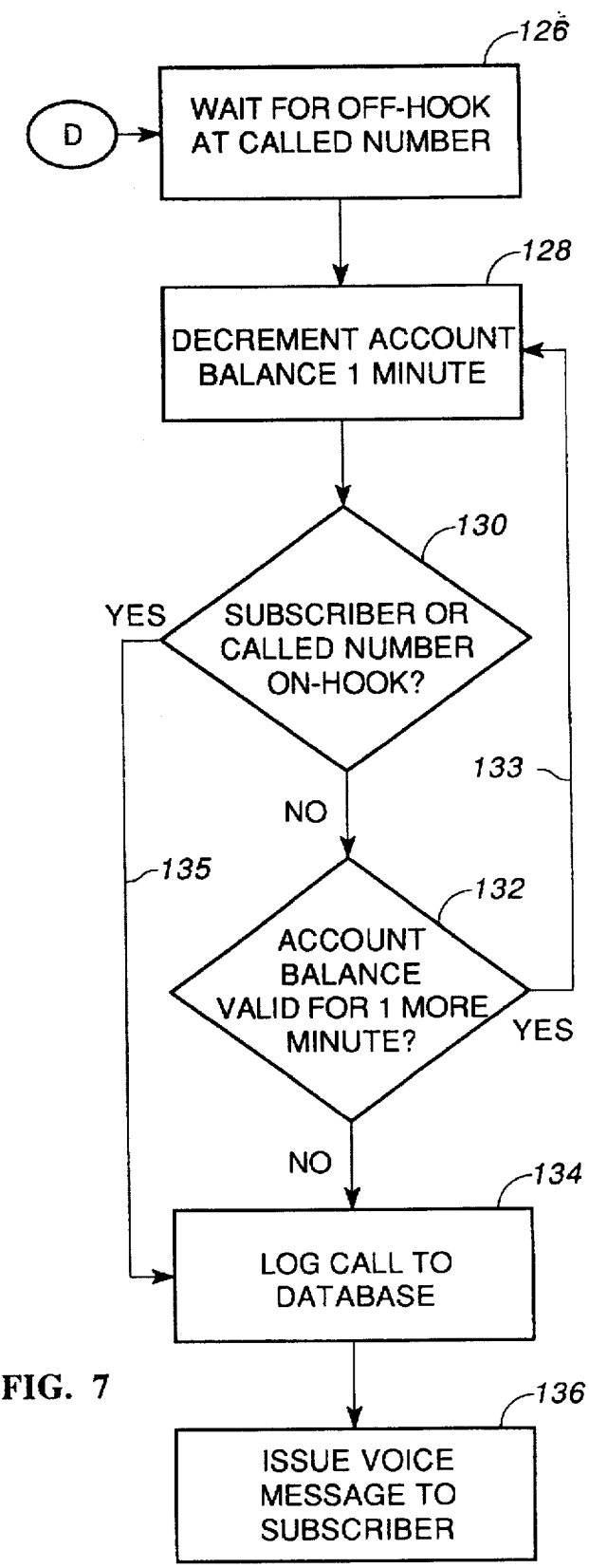
FIG. 7 is a flow diagram illustrating call accounting processing at a host computer in accordance with the present invention.

Immediately upon occurrence of an off-hook condition at the called number, the call accounting flow illustrated in FIG. 7 is executed. While the CO negotiates and seizes a T1 line from the local exchange carrier, the host computer waits at block 126 for an off-hook condition at the called number. Immediately upon occurrence of an off-hook condition at the called number, the account balance in memory is decremented by a predetermined value, corresponding to a minimum time rate based upon the DNIS and the time of day rate, e.g., $0.02 for each six seconds of telecommunications time at an off-peak, i.e., after 7:00 p.m. local time. Thus, for example, immediately upon occurrence of an off-hook condition at the destination number, a minimum time value of one minute is decremented from the account balance resident in memory.

In accordance with the preferred embodiment of the present invention, the account balance read into memory is translated to a time value based upon the called number (DNIS) and the time of day rate applicable. In this manner, the account balance is converted to a time value, e.g., number of seconds or number of minutes, and the time value is decremented based upon elapse of pre-determined time periods while either the subscriber's cellular telephone or the called number are off-hook.

After the elapse of a time period equal to the pre-determined minimum time value, the account balance is queried at block 132 to determine if there is a sufficient account balance for an additional quantum of the minimum time value. If a sufficient account balance is determined to exist at block 132, the process loops back 133 and decrements the account balance by the pre-determined minimum time value at block 128. Process loop 133 continues to execute until either the subscriber or the called number are on-hook at block 130 or until a negative response issues to the account balance validation at block 132. If either an on-hook condition at the subscriber or the called party at block 130 or the account balance is not validated at block 132, a disconnection occurs, accounting ceases and the call, including the DNIS and the elapsed time of the call are logged to the database resident at the remote server (not shown) and the remaining account balance is written to the database at block 134. The system then bridges to a voice response unit and issues a voice message to the subscriber advising the subscriber of the remaining account balance at block 136. Where it is technically feasible to decrement the account balance directly from the database, without loading the account balance to memory at the host computer, those skilled in the art will understand that the step of writing the adjusted account balance to the database may not be a necessary step.

The foregoing describes the call handling process for outgoing calls from a cellular subscriber. In those cellular service areas where the cellular service is offered only on a "calling party pays" basis, there is no need to monitor or control telecommunications events incoming to the subscriber. However, in those cellular service areas where cellular service is offered on the basis that the subscriber pays telecommunication charges irrespective of whether the subscriber is originating or receiving a call, the present system provides a method for monitoring and controlling incomming cellular telephone calls to the pro-paid subscriber and adjusting the pre-paid subscriber's account balance for incomming calls.

Figure 8A:
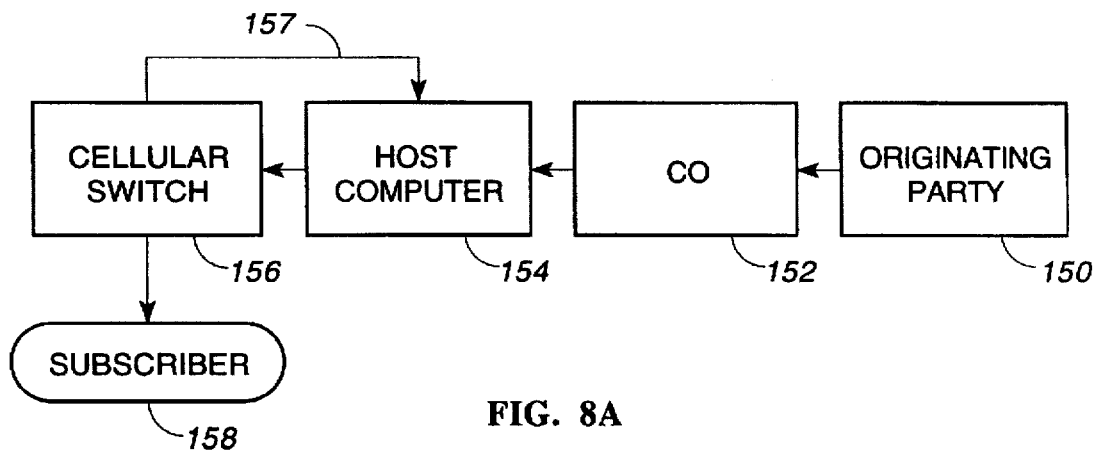
FIG. 8A is a flow diagram illustrating a first embodiment of incoming call processing in accordance with the present invention.
Figure 8B:
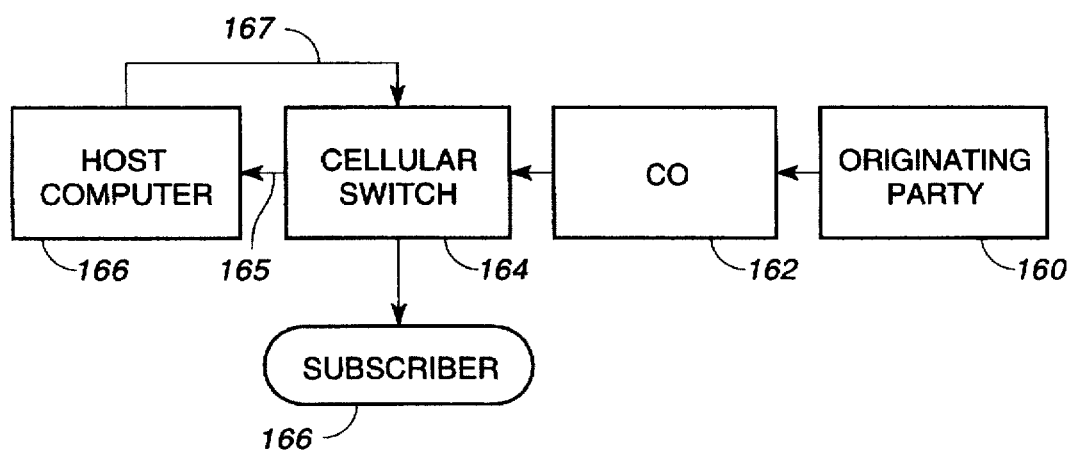
FIG. 8B is a flow diagram illustrating a second embodiment of incoming call processing in accordance with the present invention.

FIGS. 8A and 8B illustrate alternative embodiments of the system adapted to monitor and control incoming calls to a pre-paid cellular service provider. It must be understood that the operation and construction of the cellular swatch, host computer, CO and local exchange carrier are identical to that for outgoing calls made by the pre-paid subscriber. The principal difference is, however, in the sequence of events which occur to activate the call accounting and control functions of the inventive cellular telecommunications system.

We turn now specifically to FIG. 8A which illustrates a first embodiment of the inventive pre-paid cellular telecommunications system. In FIG. 8A, an originating party initiates a land line telephone call at block 150. The initiated call consists of the pre-paid subscriber's telephone number unique to the pre-paid cellular system. The call is handed to a co at block 152 and redirected to the host computer based upon the dialed number matching a pre-paid subscriber's telephone number. The host computer is initialized in a wait for CO off-hook state and waits for an incomming off-hook signal from the CO at block 154. Upon receiving an incoming call at block 154, the host computer validates the dialed number against the pre-paid subscriber database and determines whether a sufficient account balance exists for the pre-determined minimum time value for a telecommunications event, as described above with reference to FIG. 7. Upon validation of the dialed number and the available account balance, the host computer outpulses the dialed number to the cellular switch 156 which routes the call to the cellular subscriber at block 158. Upon occurrence of an off-hook condition at the cellular subscriber at block 158, the cellular switch returns 157 the off-hook condition to the host computer and call accounting as described above with reference to FIG. 7 occurs.

In accordance with a second embodiment for incoming call handling in accordance with the present invention, and as illustrated in FIG. 8B, the originating party at block 160 and the CO at block 162 function identically as described above with reference to FIG. 8A. However, in this second embodiment, the CO outpulses the mobile identifier directly to the cellular switch at block 164, and the cellular switch passes 165 the mobile identifier to the host computer at block 166 to enable the host computer to validate both the mobile identifier and the available balance. Upon such validation, the host computer at block 166 directs the cellular switch to pass the call to the subscriber at block 168.

Again, upon occurrence of an off-hook condition at the subscriber, the, host computer executes call accounting as previously described with reference to FIG. 7.

Thus, in the present invention, the disadvantages of the prior art are overcome, particularly as those disadvantages would affect a cellular user. By eliminating the need for the user to make unnecessary dialing entries and limit the user's dialing entry only to the destination number the present invention represents a valuable and needed advance in the art. Additionally, by using the ANI to identify the subscriber, rather than the situs of the call, the present invention provides for transparent call processing for the end-user and achieves a fraud tolerance level not presently available to service providers.

While the invention has been described with reference to its preferred embodiments, those skilled in the art will understand and appreciate from the foregoing that variations in equipment, operating conditions and configuration may be made and still fall within the spirit and scope of the present invention which is to be limited only by the claims appended hereto.

What is claimed is:

1. A method of cellular telecommunications, comprising the steps of:

(a) establishing a pre-paid subscriber account balance linked to a pre-determined cellular telephone number assigned to a subscriber;

(b) writing the established pre-paid subscriber account balance to a database;

(c) initiating a cellular telecommunications event, by a subscriber, by the subscriber entering a dialed call destination number and transmitting the dialed call destination number as a dialed number identification system (DNIS) code and transmitting an automated number identification code (ANI) uniquely identified with a subscriber's cellular radiotelephone;

(d) receiving the DNIS and ANI at a cellular switch, the cellular switch recognizing the ANI as belonging to a pre-paid subscriber;

(e) sending an off-hook signal from the cellular switch to a host computer;

(f) the host computer serially sending a first signal to the cellular switch to obtain the DNIS signal therefrom, receiving the first signal, sending a second signal to the cellular switch to obtain the ANI signal therefrom, and receiving the second signal at the host computer;

(g) establishing communication between the host computer and a remote server computer, the remote server computer being in communication with the subscriber database, and validating the ANI received from the cellular switch as belonging to a subscriber;

(h) validating existence of a pre-determined subscriber account balance in the subscriber database based upon the DNIS and the time of day of the telecommunications event;

(i) establishing communications between the host computer and a local exchange carrier to obtain an available telecommunications line and sending the DNIS only if an affirmative validation at step (h) occurs;

(j) checking for an off-hook condition at the DNIS destination and, upon occurrence thereof, decrementing the subscriber account balance at regular intervals during the telecommunications event until an on-hook condition exists as the DNIS destination; and (k) disconnecting the telecommunications event at the host server upon occurrence of a negative validation at step (h) or an on-hook condition exists at step (j).

2. A cellular telecommunications system for pre-paid subscribers, said system comprising:
(a) a plurality of cellular telephones, each cellular telephone being capable of transmitting an automated number identification code (ANI);
(b) a cellular switch in communication with said plurality of cellular telephones;
(c) a local exchange carrier;
(d) a pre-paid service provider including
(1) a host computer for providing pre-paid cellular service, said host computer being coupled to said local exchange carrier via switched lines and being coupled to said cellular switch via unswitched lines;
(2) a server computer coupled to and remote from said host computer, said server computer including a database containing a plurality of records identified by ANI and representing the accounts of pre-paid subscribers, each of which accounts contains information on the balance in the account; and
(3) means in said host computer for receiving a signal indicative of a pending call from said cellular switch and for forwarding the call to the local exchange carrier after confirming that the balance in the account corresponding to the ANI is greater than a predetermined minimum,
whereby said cellular switch forwards calls from the pre-paid subscribers to said pre-paid service provider via said unswitched lines.

3. The cellular telecommunications system of claim 2, wherein said host computer communicates with said local exchange carrier and said cellular switch over land-lines.

4. The cellular telecommunications system of claim 2 wherein said server computer and said host computer communicate over a local area network.

5. The cellular telecommunications system of claim 2, wherein said server computer and said host computer communicate over a wide area network.

6. The cellular telecommunications system of claim 2, wherein said database is contained in a redundant array of mass storage devices.

7. The cellular telecommunications system of claim 2, wherein said host computer includes a memory for storing subscriber account information from the database and wherein said host computer includes means revising the subscriber account information during call after connection with a dialed number.

8. The cellular telecommunications system of claim 7, wherein said host computer includes means for sending revised subscriber account information from said memory to said server computer and wherein said server computer updates the database after receipt of the revised subscriber account information.

9. The cellular telecommunications system of claim 2, wherein
said receiving and forwarding means in said host computer terminates a call when the balance in the account corresponding to the ANI is not greater than the predetermined minimum.

10. A method for pre-paid cellular telephone service, said method comprising the steps of:
forwarding to a pre-paid switching system a dialed number identification system code (DNIS) and an automated number identification code (ANI) representing a call from a cellular telephone;
at the pre-paid switching system, verifying a positive balance in an account identified by the ANI;
forwarding the call to an LEC; and
decrementing the balance in the account at regular intervals during the call until the call is terminated or until the balance is no longer positive, whichever occurs first.

11. The method as set forth in claim 10 wherein said verifying step includes the steps of:
finding the ANI; and
retrieving a balance associated with the ANI.

12. The method as set forth in claim 11 including a database of ANIs remote from the pre-paid switching system and said finding step includes the step of:
accessing the database via a remote server.

13. The method as set forth in claim 12 wherein said accessing step includes the step of:
sharing access to the database with other pre-paid switching systems.

14. The method as set forth in claim 10 and including the step of:
terminating the call when the balance in the account becomes zero.

15. A method for pre-paid cellular telephone service, said method comprising the steps of:
receiving an automated number identification code (ANI) representing a call at a cellular switch;
at the cellular switch checking the ANI against each stored reserved pre-paid cellular telephone number identifying a pre-paid subscriber; and
if the ANI is found in the stored reserved pre-paid cellular telephone numbers, then forwarding the call directly to a pre-paid service provider.

16. A method as set forth in claim 15 and further including the steps
at the pre-paid service provider, verifying a positive balance in an account associated with the ANI that was received from the cellular switch;
forwarding the call to a telecommunication service provider; and
decrementing the balance in the account at regular intervals during the call until the call is terminated.

17. The method as set forth in claim 16 wherein said decrementing step continues until the call is terminated or until the balance in the account becomes zero.

18. The method as set forth in claim 16 and including the step of:
terminating the call when the balance in the account becomes zero.

19. The method as set forth in claim 16 wherein said verifying step includes the steps of:
validating the existence of the ANI against the reserved pre-paid cellular telephone numbers; and
retrieving a balance in an account associated with the stored ANI.

20. The method as set forth in claim 19 wherein the reserved pre-paid cellular telephone numbers are stored in a database remote from the pre-paid service provider and said checking step is preceded by the step of:
accessing the database via a remote server.

21. The method as set forth in claim 20 wherein said accessing step includes the step of:
sharing access to the database with other pre-paid service providers.

* * * * *